United States Patent
Zielinski et al.

(10) Patent No.: US 7,658,430 B2
(45) Date of Patent: Feb. 9, 2010

(54) SEAT STRIKER MECHANISM

(75) Inventors: Mary K. Zielinski, Novi, MI (US); Paul H. Shea, Livonia, MI (US); Michael L. Rogers, Southfield, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 443 days.

(21) Appl. No.: 11/751,794

(22) Filed: May 22, 2007

(65) Prior Publication Data

US 2008/0061617 A1   Mar. 13, 2008

Related U.S. Application Data

(60) Provisional application No. 60/818,077, filed on Jun. 30, 2006.

(51) Int. Cl.
*B60N 2/00* (2006.01)

(52) U.S. Cl. .................. 296/65.16; 296/63; 297/378.13

(58) Field of Classification Search .................. 296/63, 296/65.01, 65.09, 65.16, 65.17; 297/378.1, 297/378.11, 378.12, 378.13
See application file for complete search history.

(56) References Cited

U.S. PATENT DOCUMENTS

| | | | |
|---|---|---|---|
| 4,609,221 A * | 9/1986 | Bottcher | 296/65.09 |
| 4,639,040 A * | 1/1987 | Fujita et al. | 297/378.13 |
| 6,073,986 A * | 6/2000 | Neale et al. | 296/63 |
| 6,132,000 A * | 10/2000 | Tanaka | 297/378.13 |
| 7,494,187 B2 * | 2/2009 | Inoue et al. | 297/378.13 |
| 2004/0007909 A1 * | 1/2004 | Bonk | 297/378.13 |

* cited by examiner

*Primary Examiner*—Joseph D Pape
(74) *Attorney, Agent, or Firm*—Ralph E. Smith

(57) ABSTRACT

A seat assembly for a motor vehicle having a floor and a structural pillar is provided, the seat assembly including a seat bottom frame attached to the floor and a seat back frame pivotally attached to the seat bottom frame. The seat back frame is capable of pivoting between a stowed position where the seat back frame is generally parallel to the seat bottom frame and an upright position where the seat back frame is generally perpendicular to the seat bottom frame. A striker mechanism is positioned on the seat back frame and is capable of assuming a normal position arranged to engage a latch located in the structural pillar of the vehicle when the seat assembly is in an upright position, and a refracted position where the striker mechanism is retracted towards the seat back frame as the seat assembly Is pivoted from the upright position to the stowed position.

18 Claims, 9 Drawing Sheets

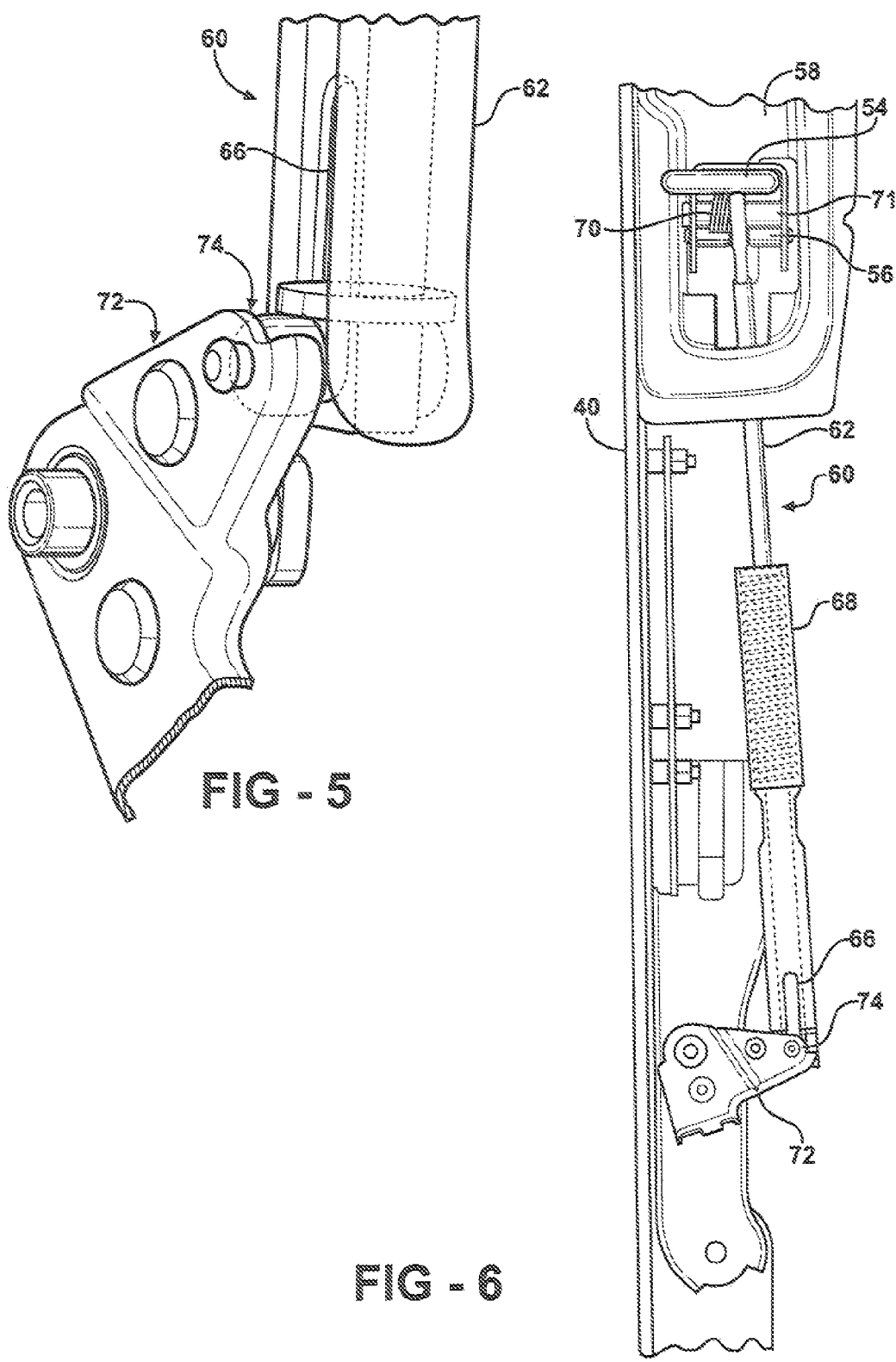

SEAT STRIKER MECHANISM

CROSS-REFERENCE TO RELATED APPLICATION

This application claims the benefit of U.S. Provisional Application Ser. No. 60/818,077 filed Jun. 30, 2006.

FIELD OF THE INVENTION

The present invention relates generally to a seat assembly for a motor vehicle and, more particularly, to a seat assembly having an improved striker mechanism.

BACKGROUND OF THE INVENTION

In motor vehicle design, it is advantageous to provide additional structure and support for a seat assembly which will be located in close proximity to the rear liftgate glass in a vehicle such as a sport utility vehicle having three rows of passenger seating. One potential solution to this need for additional support is the use of a high lock design which permits the seat to be locked in place by use of a striker locking the seat back in an upright position relative to the vehicle.

However, federal motor vehicle head impact regulations mandate that an object extending into the vehicle's interior above the passenger's belt line may not protrude into the occupant seating area of the vehicle. As a result, it is not possible to extend & striker from one of the vehicle's pillars into the interior of the vehicle to secure a seat assembly in an upright position.

Alternatively, a striker capable of interlocking with a latch contained within the vehicle pillars could be provided as support structure. However, motor vehicle interior design requires minimal gaps between the seat assembly and the interior trim panels of the vehicle when the seat back is folded down onto the seat bottom. The placement of a striker on the seat back of the seat assembly would typically require the inclusion of a large gap between the seat back and the interior trim panels when the seat back is folded down onto the seat bottom.

Therefore, there exists a need in the art for a seat assembly having a striker mechanism that can be mounted to the seat back of the seat assembly. There further exists a need in the art for a seat assembly having a striker mechanism that does not require the inclusion of a large gap between the seat back and the interior trim panels when the seat back is folded down onto the seat bottom.

SUMMARY OF THE INVENTION

Accordingly, one aspect of the present invention is to provide a seat assembly having a striker mechanism that can be mounted to the seat back of the seat assembly.

Another aspect of the present invention is to provide a seat assembly having a striker mechanism, that does not require the inclusion of a large gap between the seat back and the interior trim panels when the seat back is folded down onto the seat bottom.

In accordance with, the foregoing aspects of the invention, a seat assembly for a motor vehicle having a floor and a structural pillar is provided, the seat assembly including a seat bottom frame attached to the floor and a seat back frame pivotally attached to the seat bottom frame. The seat back frame is capable of pivoting between a stowed position where the seat back frame is generally parallel, to the seat bottom frame and an upright position where the seat back frame is generally perpendicular to the seat bottom frame. A striker mechanism is positioned on the seat, back frame and is capable of assuming a normal position arranged to engage a latch located in the structural pillar of the vehicle when the seat assembly is in an upright position, and a retracted position where the striker mechanism is retracted towards the seat back frame as the seat assembly is pivoted from the upright position to the stowed position.

Further areas of applicability of the present invention will become apparent, from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional features and understanding of the present invention will become more fully apparent from, the attached description and accompanying drawings, wherein:

FIG. 5 is a perspective view of an actuation bracket and push rod assembly in accordance with an exemplary embodiment of the present invention;

FIG. 6 is a side view of a striker mechanism and push rod assembly in accordance with an exemplary embodiment of the present invention;

DETAILED DESCRIPTION OF THE PREFERRED EMBODIMENTS

Figure 1:
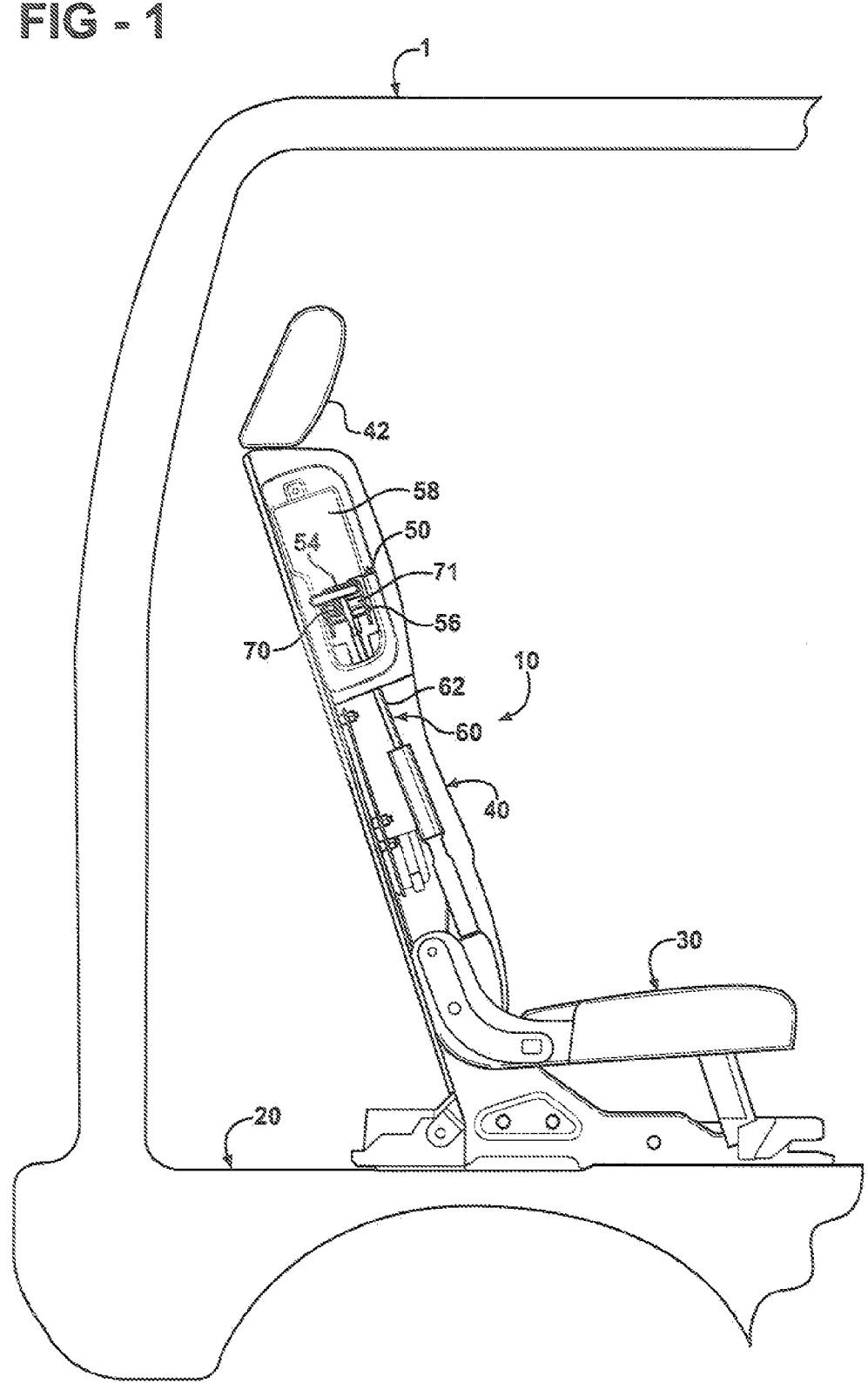
FIG. 1 is a side view of a seat assembly in accordance with an exemplary embodiment of the present invention.
Figure 2:
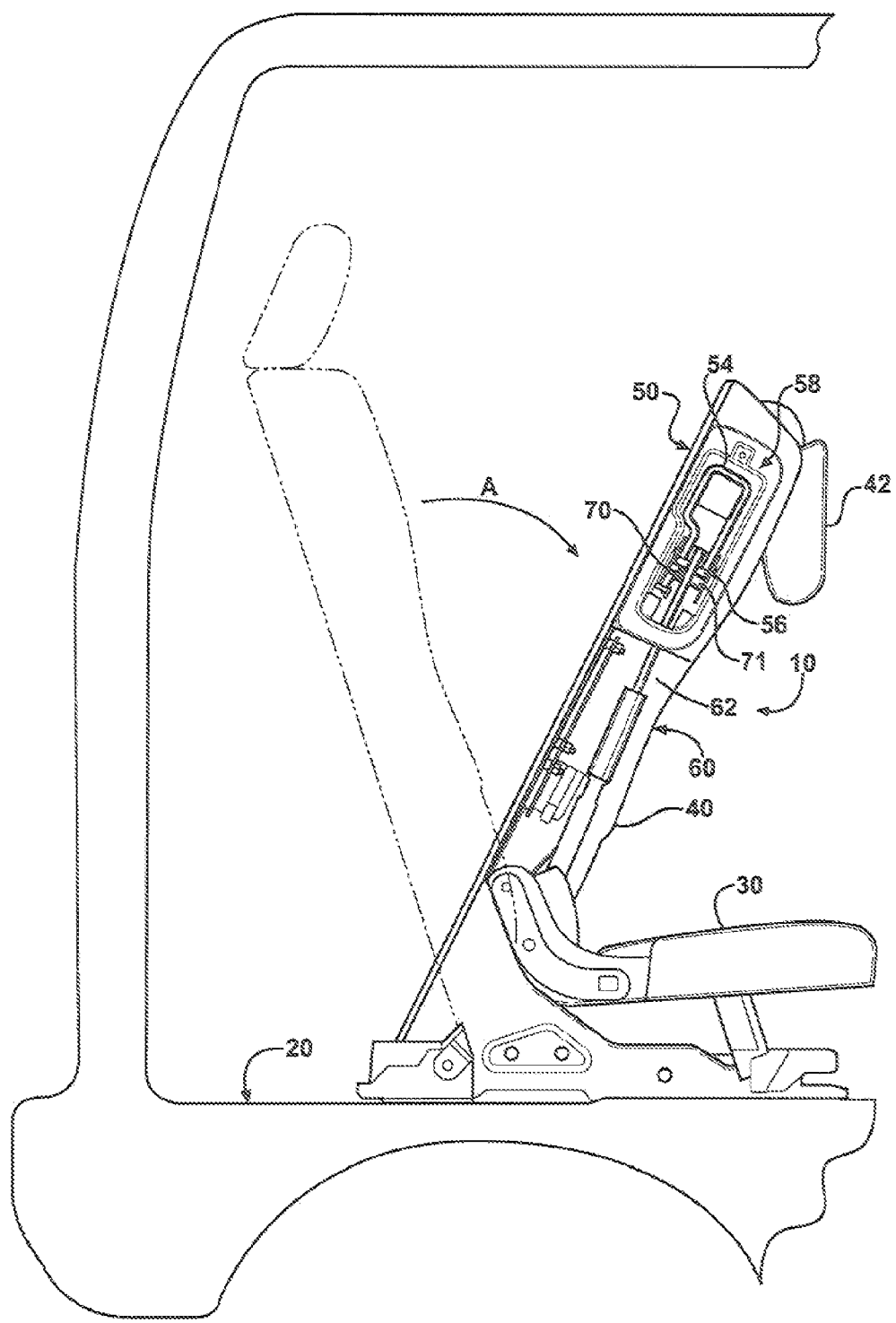
FIG. 2 is a side view of a seat assembly in accordance with an exemplary embodiment of the present invention.
Figure 3:
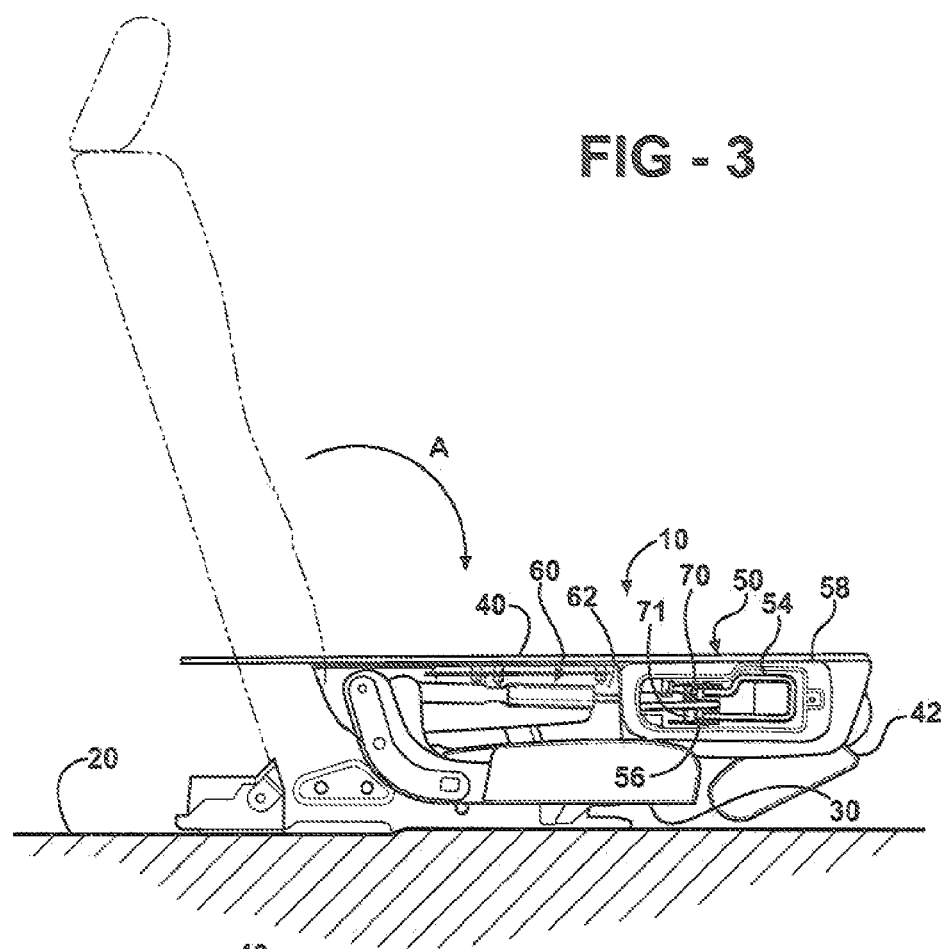
FIG. 3 is a side view of a seat assembly in accordance with an exemplary embodiment of the present invention.
Figure 4:
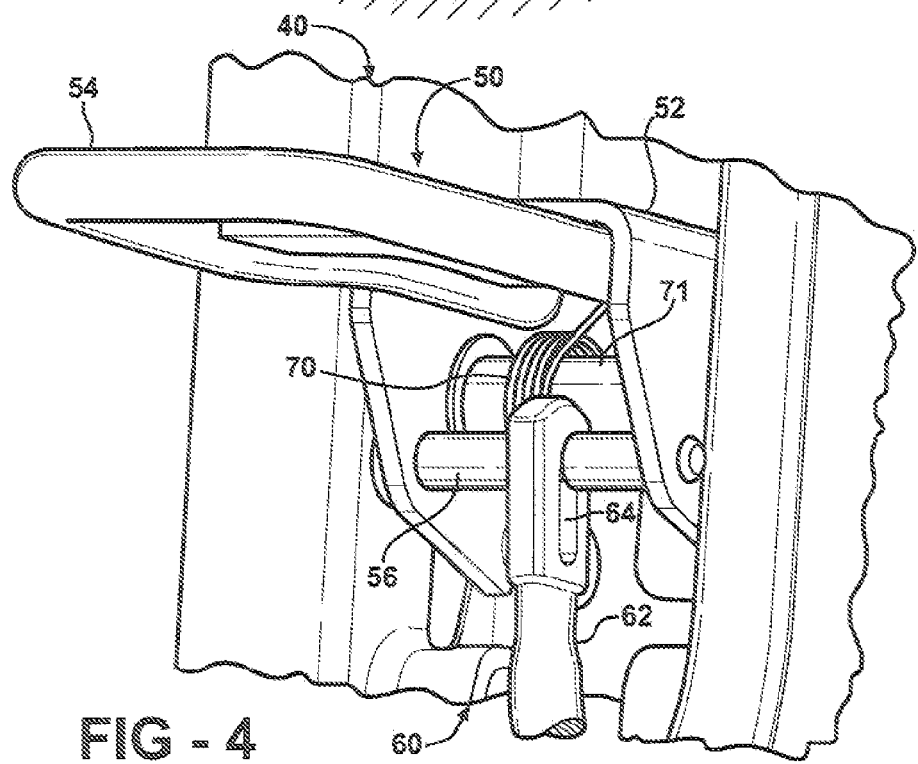
FIG. 4 is a perspective view of a striker mechanism and push rod assembly in its normal position in accordance with an exemplary embodiment of the present invention.
Figure 8:
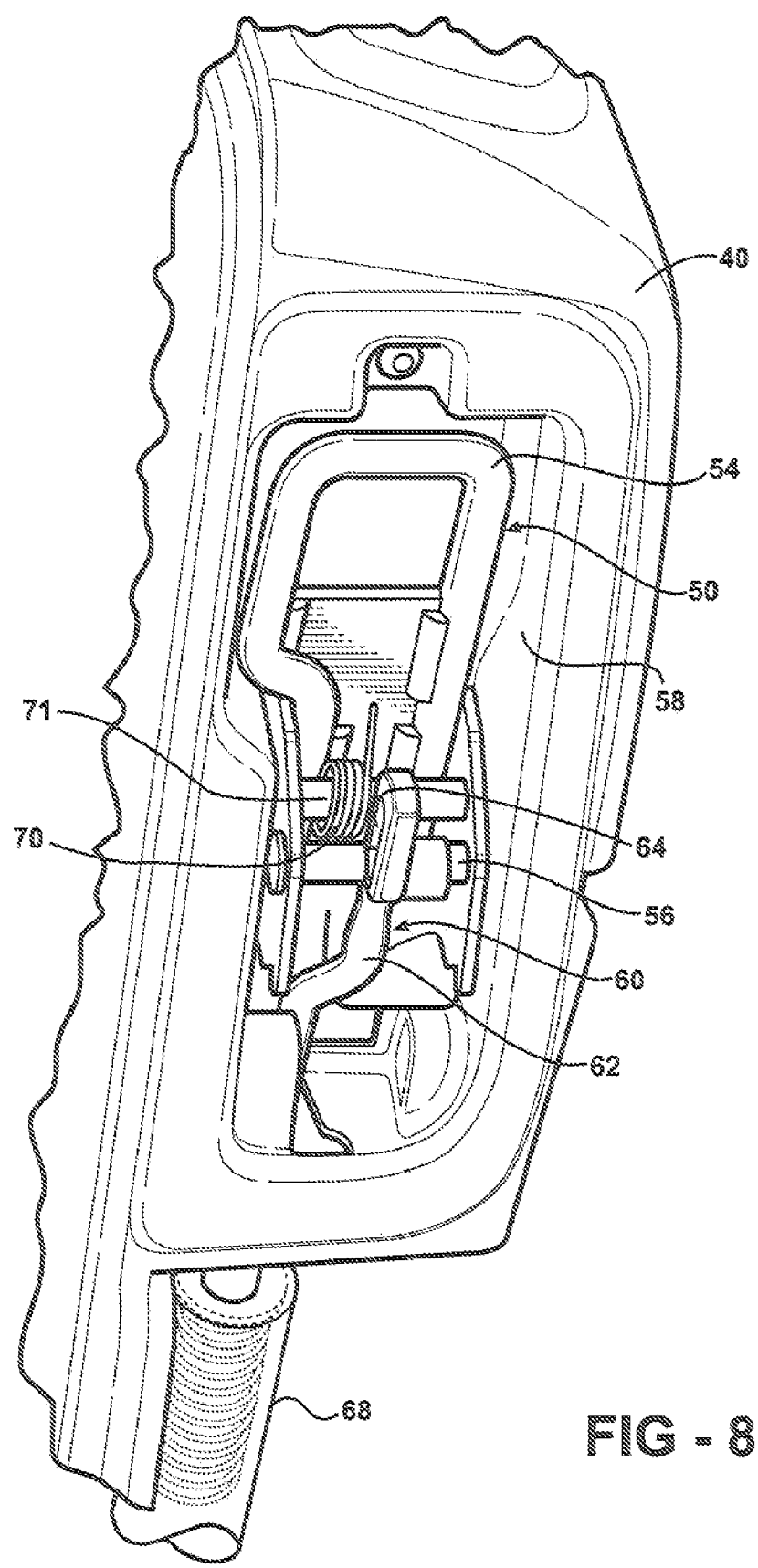
FIG. 8 is a perspective view of a striker mechanism and striker receptacle in accordance wife an exemplary embodiment of the present invention.
Figure 10:
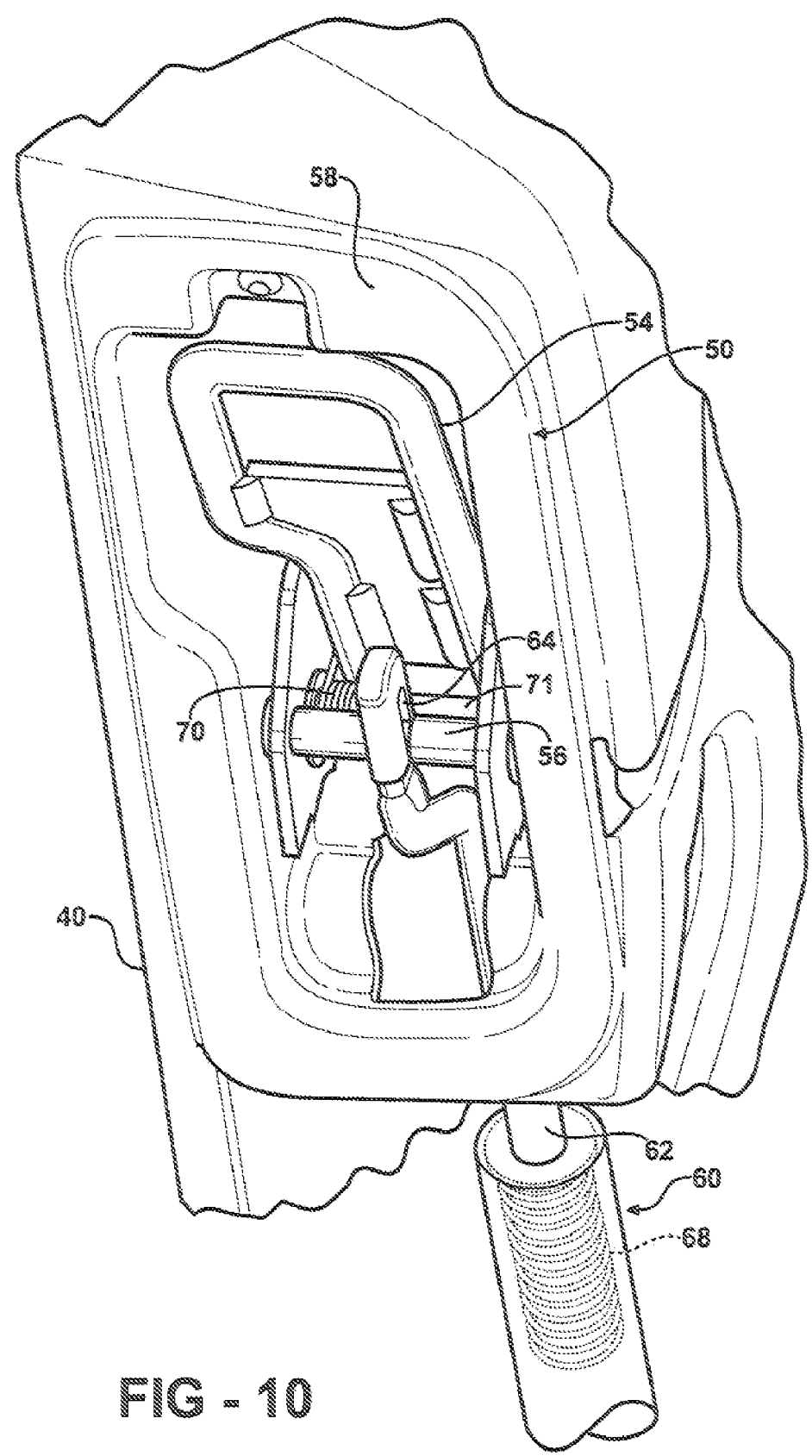
FIG. 10 is a perspective view of a striker mechanism and striker receptacle in accordance with an exemplary embodiment of the present invention.
Figure 11:
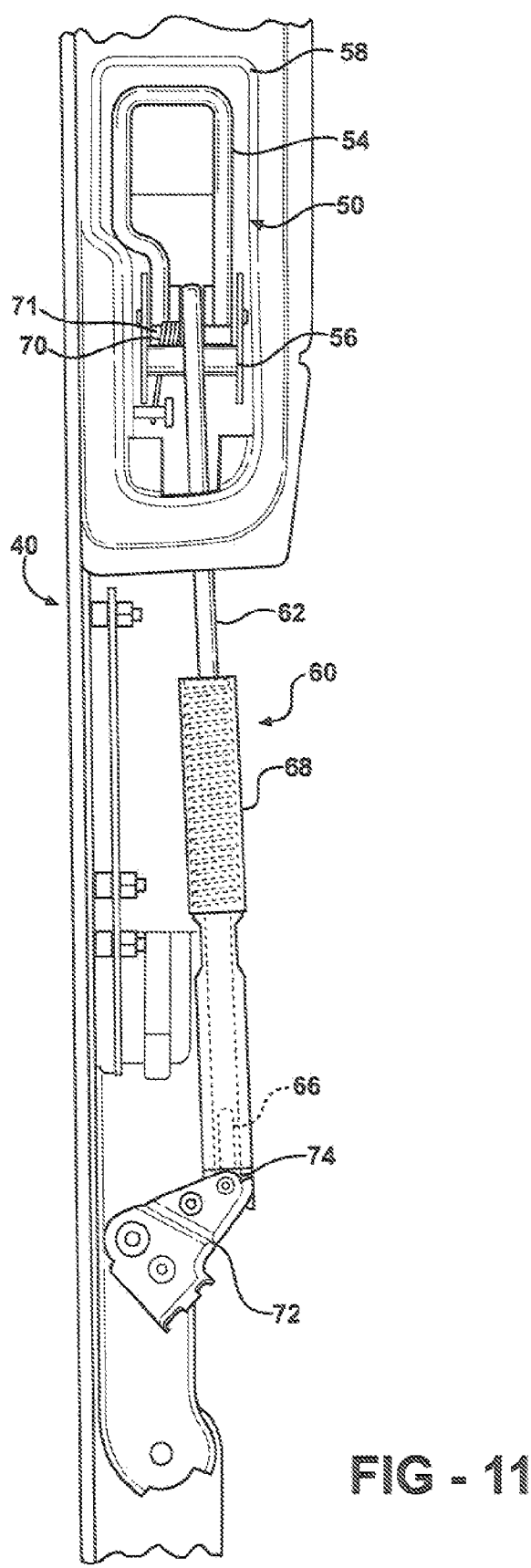
FIG. 11 is a side view of a seat assembly having a stoker mechanism in accordance with an exemplary embodiment of the present invention.

In accordance with a first exemplary embodiment of the present invention, as best shown in FIG. 1, a seat assembly 10 for a motor vehicle 1 having a floor 20 is provided having a seat bottom frame 30 pivotally connected to a seat back frame 40. The seat bottom, frame 30 is attached to the floor 20 of the vehicle 1. As shown in FIGS. 1 and 2, a head rest 42 is provided and is pivotally coupled to the seat back frame 40. As shown in FIGS. 1-3, the seat assembly 10 is capable of being pivoted in the direction of-arrow A between, a first, seated position (as best shown in FIG. 1) in which a passenger may be seated in the seat assembly 10 and a second, stowed position (as best shown in FIG. 3) in which the seat back frame 40 is folded flat onto the seat bottom frame 30, As best shown in FIG. 4, a striker mechanism 50 is provided having a striker bracket 52 which is pivotally connected to the seat back frame 40 about a pivot pin 71 and a striker member 54 which is connected to the striker bracket 52. A striker receptacle 58, best shown in FIG. 8, is provided which is attached to the seat back frame 40 and arranged to receive the striker member 54. When the seat assembly 10 is in a seated position, the striker mechanism 50 in its normal position is arranged to engage a hitch (not shown) located in a structural pillar of the vehicle 1, for example, the d-pillar of the vehicle 1. The striker mechanism 50 further includes an upper pivot spring 70 slidably connected to the striker bracket 52 about a striker pivot pin 56 and arranged to bias the striker member 54 into its normal position. As the seat assembly 10 is pivoted into a stowed position, the striker mechanism 50 is arranged to pivot relative to the seat back frame 40 to assume a retracted position within the striker receptacle 58 flush with the outer edge of the seat back frame 40, as shown in FIGS. 8, 10 and 11. The rotation of the striker mechanism 50 relative to the seat back frame 40 is accomplished through the interaction of the striker mechanism 50 with a push rod assembly 60.

The push rod assembly 60 includes a push rod 62, as best shown in FIGS. 4-6, having integrally formed, upper 64 and lower slots 66 located at either end of the push rod 62. As shown in FIG. 6, the push rod assembly 60 further includes a lower pivot spring 68 which is connected to the push rod 62. As further shown in FIG. 5, the lower slot 66 of the push rod 62 is slidably connected to an actuation bracket 72 about an actuation pivot pin 74. The actuation bracket 72 is further pivotally connected to the seat back frame 40. Similarly, as shown in FIG. 4, the upper slot 64 of the push rod 62 is slidably connected to the striker pivot pin 56.

Figure 7:
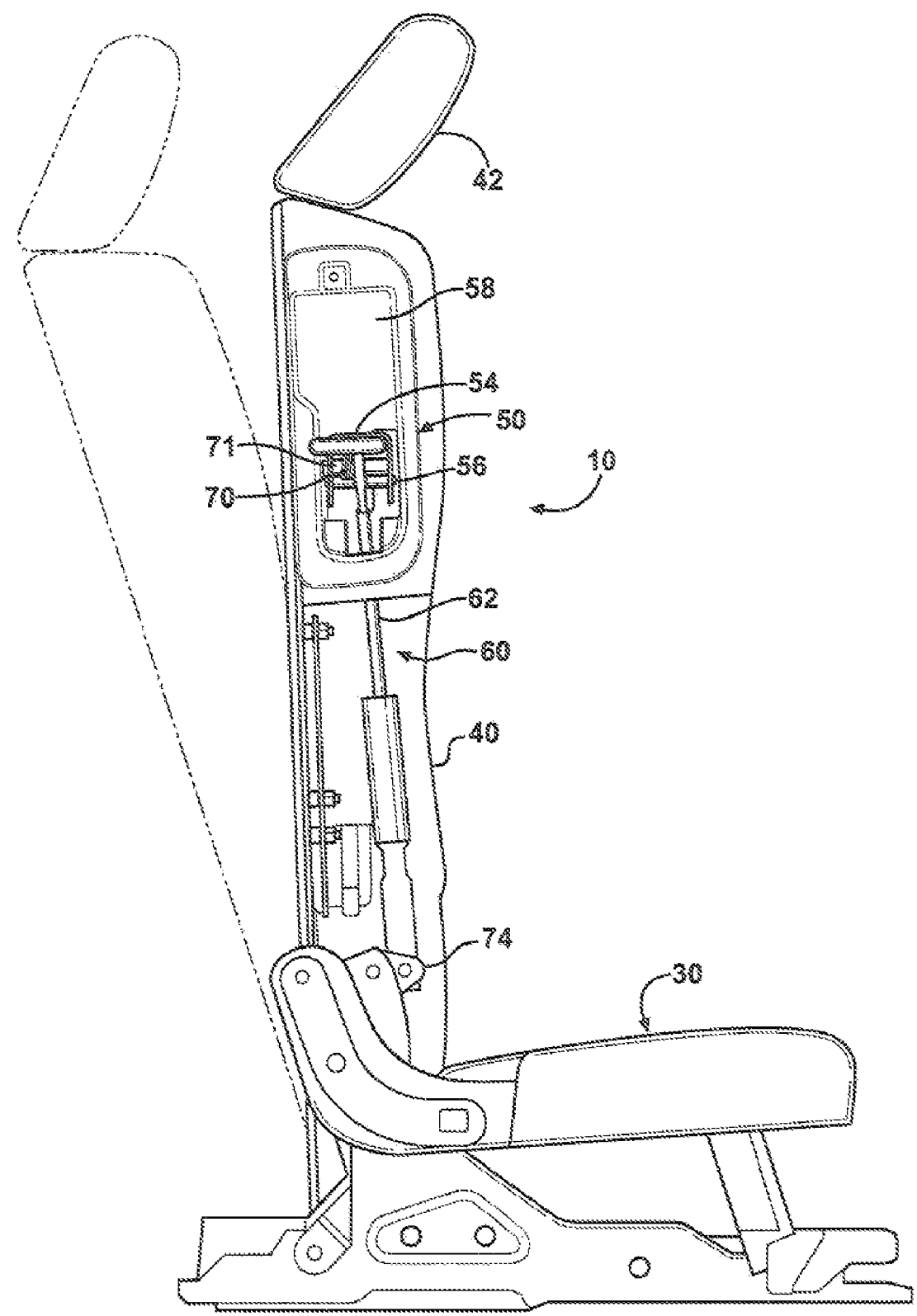
FIG. 7 is a side view of a seat assembly having a striker mechanism in accordance with an exemplary embodiment of the present invention.
Figure 9:
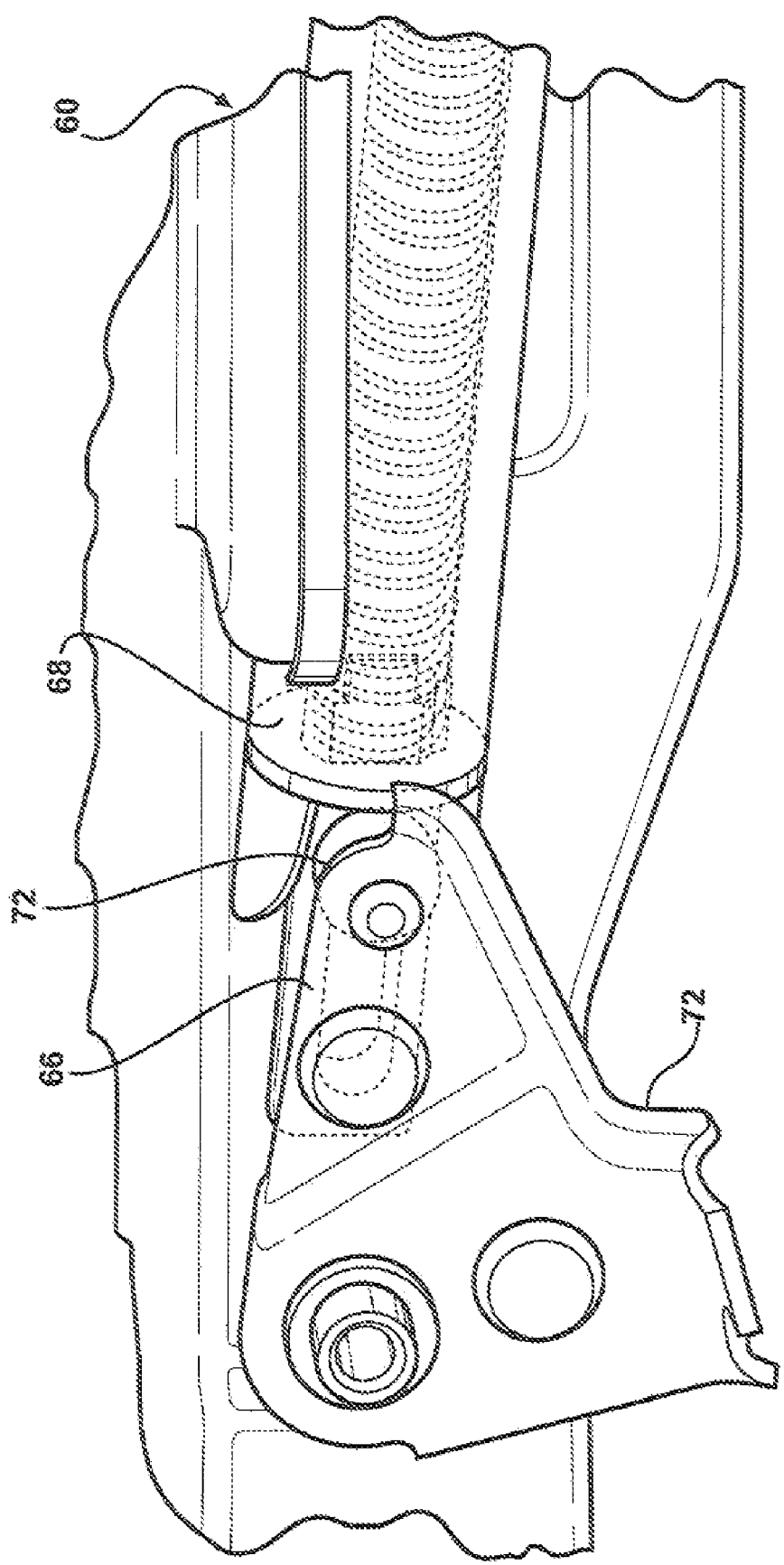
FIG. 9 is a perspective view of a push rod assembly and actuation bracket in accordance with an exemplary embodiment of the present invention.

The operation of the seat assembly 10 to cause the striker mechanism 50 to retract into the striker receptacle 58 is next described. As best shown in FIGS. 4-5, when the seat assembly 10 is m the seated position, the striker mechanism 50 is biased into its normal position by the upper pivot spring 70. In the seated position, the lower pivot spring 68 biases the push rod 62 into a position where the actuation pivot pin 74 is located at the bottom of the lower slot 66 and the striker pivot pin 56 is located at the top of the upper slot 64 creating tension in the push, rod 62. As shown in FIGS. 6 and 7, as the seat assembly 10 is initially pivoted toward a stowed position, the actuation bracket 72 rotates relative to the scat back frame 40 causing the push rod 62 to move upwardly and the striker pivot pro 56 to move to the bottom of the upper slot 64. As shown in FIG. 10, as the seat assembly 10 continues to pivot, into a stowed position, the push rod 62 biases the striker member 54 Into its retracted position while the force provided by the lower pivot spring 68 maintains the actuation pivot pin 74 in its position at the bottom of the lower slot 66. Finally, as shown in FIG. 9, the force provided by the lower pivot spring 68 is overcome by the weight of the seat back frame 40 as the seat assembly 10 reaches its final stowed position and the actuation pivot pin 74 moves to the top of the lower slot 66. The final position of the striker mechanism 50, push rod assembly 60 and actuation bracket 72 is shown in FIG. 11.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the Invention will Include any embodiments falling within the scope of the appended claims.

What is claimed is:

1. A seat assembly for a motor vehicle having a floor and a structural pillar, the seat assembly comprising:
   a seat bottom frame attached to said floor of said motor vehicle;
   a seat back frame pivotally attached to said seat bottom frame, said seat back frame capable of pivoting between a stowed position wherein said seat back frame is generally parallel to said seat bottom frame and an upright position wherein said seat back frame is generally perpendicular to said seat bottom frame;
   a striker mechanism positioned on said seat back frame, said striker mechanism arranged to be moveable between a normal position wherein the striker mechanism engages a latch located on said structural pillar of said vehicle when said seat assembly is in an upright position, and a retracted position wherein said striker mechanism is pivoted toward said seat back frame as said seat assembly is pivoted from said upright position to said stowed position.

2. The seat assembly of claim 1, wherein said structural pillar is a d-pillar of said vehicle.

3. The seat assembly of claim 1, said seat assembly further comprising:
   a striker bracket pivotally connected to said seat back frame, said striker bracket farther including a striker pivot pin;
   a striker member connected to said striker bracket;
   a striker receptacle attached to said seat back frame and arranged to receive said striker member; and
   wherein when said striker mechanism is in said normal position, said striker member is arranged to engage said latch located in said structural pillar of said vehicle when said seat assembly is in said upright position.

4. The seat assembly of claim 3, said seat assembly further comprising:
   an upper spring connected to said striker bracket, said upper spring arranged to bias said striker member into said normal position of said striker mechanism.

5. The seat assembly of claim 3, wherein said striker mechanism in said retracted position is located within said striker receptacle flush with an outer edge of said seat back frame.

6. The seat assembly of claim 1, further comprising a push rod assembly connected to the striker mechanism and arranged to pivot said striker mechanism towards said seat back frame.

7. The seat assembly of claim 6, wherein said seat assembly further comprising: a striker bracket pivotally connected to said seat back frame, said striker bracket further including a striker pivot pin and said push rod assembly further comprises:
   a push rod having an integrally formed upper slot and lower slot located at respective ends of said push rod;
   a lower pivot spring attached to a lower end of said push rod;
   said lower slot of said push rod slidably attached to an actuation bracket about an
   actuation pivot pin, said actuation bracket further pivotally attached to said seat back frame; and said upper slot of said push rod slidably connected to said striker pivot pin.

8. The seat assembly of claim 7, wherein in said normal position said lower pivot spring is arranged to bias said push rod to locate said actuation pivot pin at the bottom of said lower slot and to locate said strike pivot pin at the top of said upper slot.

9. The seat assembly of claim 8, said seat assembly further comprises a striker member connected to said striker bracket and wherein as said seat assembly is pivoted into said stowed position:
said actuation bracket rotates relative to said seat back frame, moving said push rod upwardly and said strike pivot pin to move to said bottom of said upper slot;
said push rod biases said striker member into said retracted position while said lower pivot spring continues to bias said actuation pivot pin at said bottom of said lower slot; and
the weight of said seat back frame overcomes the bias of said lower pivot spring and said actuation pivot pin moves to the top of said lower slot.

10. A motor vehicle, the motor vehicle comprising:
a floor;
a structural pillar;
a seat assembly attached to said floor, said seat assembly further including a seat bottom and a seat back;
said seat back pivotally attached to said seat bottom, wherein said seat back is arranged to pivot between a stowed position wherein said seat back is generally parallel to said seat bottom and an upright position wherein said seat back is generally perpendicular to said seat bottom;
a striker mechanism positioned on said seat back frame, said striker mechanism arranged to engage a latch located in said structural pillar of said vehicle when the seat assembly is in an upright position; and
retract toward said seat back frame as said seat assembly is pivoted from said uptight position to said stowed position.

11. The motor vehicle of claim 10, wherein said structural pillar is a d-pillar of said vehicle.

12. The motor vehicle of claim 10, said motor vehicle further comprising:
a striker bracket pivotally connected to said seat back frame, said striker bracket further including a striker pivot pin;
a striker member connected to said striker bracket;
a striker receptacle attached, to said seat back frame and arranged to receive said striker member; and
wherein when said striker mechanism is in said normal position, said striker member is arranged to engage said latch located in said structural pillar of said vehicle when said seat, assembly is in said upright position.

13. The motor vehicle of claim 12, said motor vehicle further comprising:
an upper spring connected to said striker bracket, said upper spring arranged to bias said striker member into said normal position of said striker mechanism.

14. The motor vehicle of claim 12, wherein said striker mechanism in said retracted, position is located within said striker receptacle flush with an outer edge of said seat, back frame.

15. The motor vehicle of claim 10, wherein a push rod assembly pivots said striker mechanism towards said seat back frame.

16. The motor vehicle of claim 15, wherein said seat assembly further comprising: a striker bracket pivotally connected to said seat back frame, said striker bracket further including a striker pivot pin and said push rod assembly further comprises:
a push rod having an integrally formed upper slot and lower slot located at respective ends of said push rod:
a lower pivot spring attached to a lower end of said push rod;
said lower slot of said push rod slidably attached to an actuation bracket about an actuation pivot pin, said actuation bracket further pivotally attached to said seat back frame; and
said upper slot of said push rod slidably connected to said striker pivot pin.

17. The motor vehicle of claim 16, wherein said lower pivot spring is arranged to bias said push rod to locate, said actuation pivot pin at the bottom of said lower slot and to locate said striker pivot pin at the top of said upper slot.

18. The motor vehicle of claim 17, said seat assembly further comprises a striker member connected to said striker bracket and wherein as said seat assembly is pivoted into said stowed position:
said actuation bracket rotates relative to said seat back frame, moving said push rod upwardly and said striker pivot pin to move to said bottom of said upper slot;
said push rod biases said striker member into said retracted position while said lower pivot spring continues to bias said actuation pivot pin at said bottom of said lower slot; and
the weight of said seat back frame overcomes the bias of said lower pivot spring and said actuation pivot pin moves to the top of said lower slot.

* * * * *